US012580755B2

(12) United States Patent
Huang et al.

(10) Patent No.: US 12,580,755 B2
(45) Date of Patent: Mar. 17, 2026

(54) DISTRIBUTED KEY GENERATION SYSTEM AND KEY GENERATION METHOD

(71) Applicant: Block Chain Security Corp., Taipei City (TW)

(72) Inventors: Chin-Po Huang, Taipei City (TW); Chi-Wei Feng, Taipei City (TW); Hung-Yi Liu, Taipei City (TW)

(73) Assignee: BLOCK CHAIN SECURITY CORP., Taipei City (TW)

( * ) Notice: Subject to any disclaimer, the term of this patent is extended or adjusted under 35 U.S.C. 154(b) by 379 days.

(21) Appl. No.: 18/128,768

(22) Filed: Mar. 30, 2023

(65) Prior Publication Data

US 2024/0195615 A1 Jun. 13, 2024

(30) Foreign Application Priority Data

Dec. 12, 2022 (TW) .................................. 111147669

(51) Int. Cl.
*H04L 9/08* (2006.01)
(52) U.S. Cl.
CPC .................................. *H04L 9/0869* (2013.01)
(58) Field of Classification Search
CPC ..... H04L 9/0869; H04L 63/06; H04L 9/0861; H04L 9/14
See application file for complete search history.

(56) References Cited

U.S. PATENT DOCUMENTS

| | | | | |
|---|---|---|---|---|
| 5,852,638 | A * | 12/1998 | Chen | H04L 27/144 329/304 |
| 11,050,564 | B1 * | 6/2021 | Guo | G06F 21/6209 |
| 11,783,020 | B1 * | 10/2023 | Johnson | H04W 4/80 726/19 |
| 2003/0133576 | A1 * | 7/2003 | Grumiaux | H04L 9/0866 380/279 |
| 2004/0078643 | A1 * | 4/2004 | Ghosh | G06F 11/1076 714/E11.034 |
| 2013/0227286 | A1 * | 8/2013 | Brisson | H04L 63/062 713/168 |
| 2023/0231840 | A1 * | 7/2023 | Wu | H04L 9/3297 713/159 |
| 2023/0396440 | A1 * | 12/2023 | Tokuyama | H04L 9/0825 |

FOREIGN PATENT DOCUMENTS

DE 60206809 T2 * 4/2006 ........... H04L 9/0869

OTHER PUBLICATIONS

Nian Tianshou, "Chapter 4 Hash and Random Arithmetic," Introduction to Information and Network Security, Oct. 20, 2017, pp. 1-18, with an English translation.

* cited by examiner

*Primary Examiner* — Lizbeth Torres-Diaz
(74) *Attorney, Agent, or Firm* — Birch, Stewart, Kolasch & Birch, LLP

(57) ABSTRACT
A distributed key generation system and a key generation method are provided. The distributed key generation system includes a plurality of electronic devices and a server device. Each electronic device sends a data fragment. The server device synthesizes the key according to the data fragments. In this way, the key is not generated in advance, which can reduce the risk of key leakage.

15 Claims, 2 Drawing Sheets

Each electronic device generates a data fragment in response to a key generation instruction ∿ 41

The server device receives the data fragment from the electronic device and generates at least two sequences according to the data sequence ∿ 42

The server device cascades each sequence and performs hash algorithm to form a seed, and generates a key according to the seed ∿ 43

DISTRIBUTED KEY GENERATION SYSTEM AND KEY GENERATION METHOD

CROSS-REFERENCE TO RELATED APPLICATION

This non-provisional application claims priority under 35 U.S.C. § 119(a) to Patent Application No. 111147669 filed in Taiwan, R.O.C. on Dec. 12, 2022, the entire contents of which are hereby incorporated by reference.

BACKGROUND

Technical Field

The instant disclosure relates to a key generation technology, and particularly relates to a distributed key generation system and a key generation method.

Related Art

Private key loss and stealing accidents of an encrypted currency wallet often occur. A single private key is convenient, but it brings the risk that assets are easily transferred. This risk is intolerable for enterprises or large groups.

SUMMARY

An embodiment of the instant disclosure provides a distributed key generation system, which includes a plurality of electronic devices and a server device. Each electronic device sends a data fragment to the server device. The server device is configured to receive the data fragments sent by the electronic devices, and perform multiple times of quadrature or summation operations according to the data fragments, so as to generate a sequence after each operation. The server device is further configured to cascade each sequence and perform hash algorithm to form a seed, and generate a key according to the seed.

Another embodiment of the instant disclosure provides a key generation method, which is executed by a processor. The key generation method includes the following steps: acquiring a plurality of data fragments; performing multiple times of quadrature or summation operations according to the data fragments to generate a sequence after each operation; cascading each sequence, and performing hash algorithm on the cascaded sequences to form a seed; and generating a key according to the seed.

According to the distributed key generation system and the key generation method provided by the embodiments of the instant disclosure, the key is not generated in advance and then segmented; the plurality of electronic devices respectively provide the data fragments, and the key is synthesized in real time according to the data fragments. Therefore, the risk of key leakage when the key is generated in advance can be avoided. In addition, the data fragments are dispersedly stored by the plurality of electronic devices, so that the security can be enhanced.

DETAILED DESCRIPTION

Figure 1:
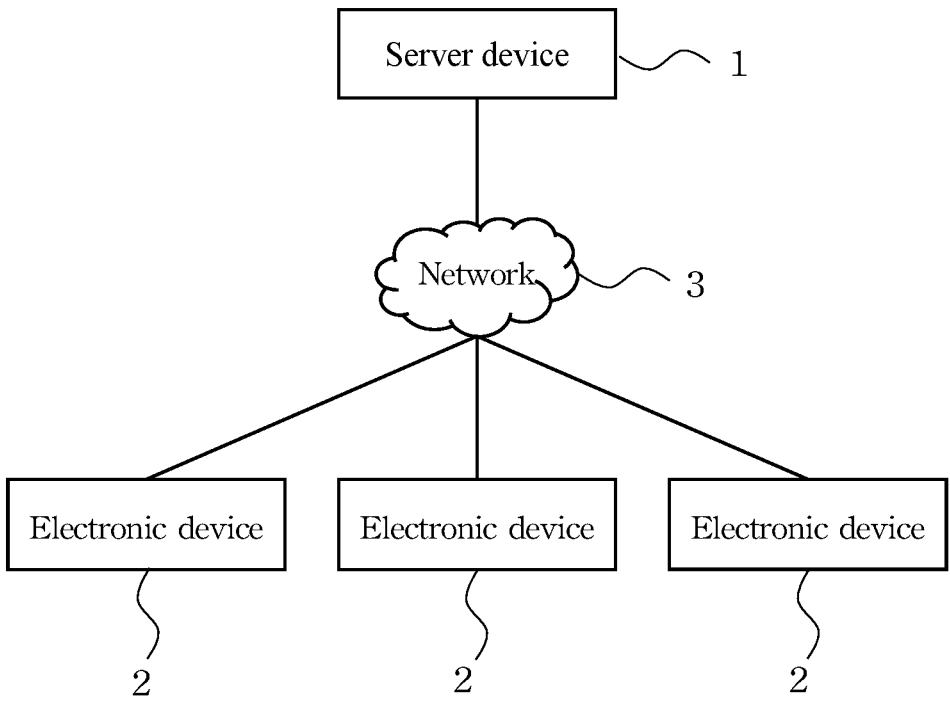
FIG. 1 is a schematic framework diagram of a distributed key generation system according to one embodiment of the instant disclosure.

Referring to FIG. 1, it is a schematic framework diagram of a distributed key generation system according to one embodiment of the instant disclosure. The system includes a server device 1 and a plurality of electronic devices 2. The server device 1 and the electronic devices 2 are connected to a network 3 for mutual communication. The server device 1 can be one or more servers. The electronic devices 2 can be networking devices such as mobile phones and computers. The server device 1 and the electronic devices 2 are all provided with a processor for executing programs, a memory for storing the programs or/and data, a communication circuit (such as a circuit supporting at least one of a wireless network, a wired network and a mobile network) for providing a network communication function, input and output interfaces for a user to operate, etc. Herein, three electronic devices 2 are taken as examples for facilitating subsequent illustration. The embodiments of the instant disclosure are not limited thereby.

Figure 2:
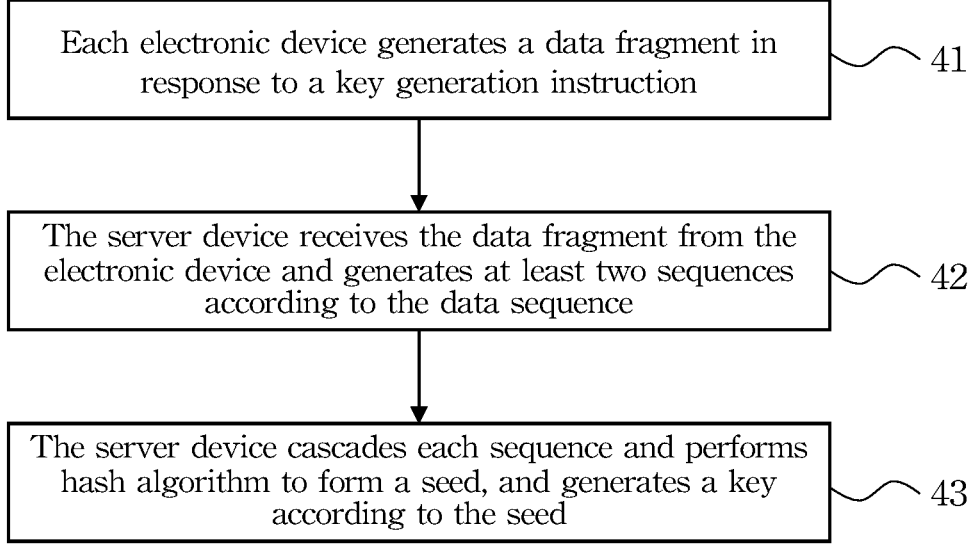
FIG. 2 is a flowchart of a key generation method according to one embodiment of the instant disclosure.
Figure 3:
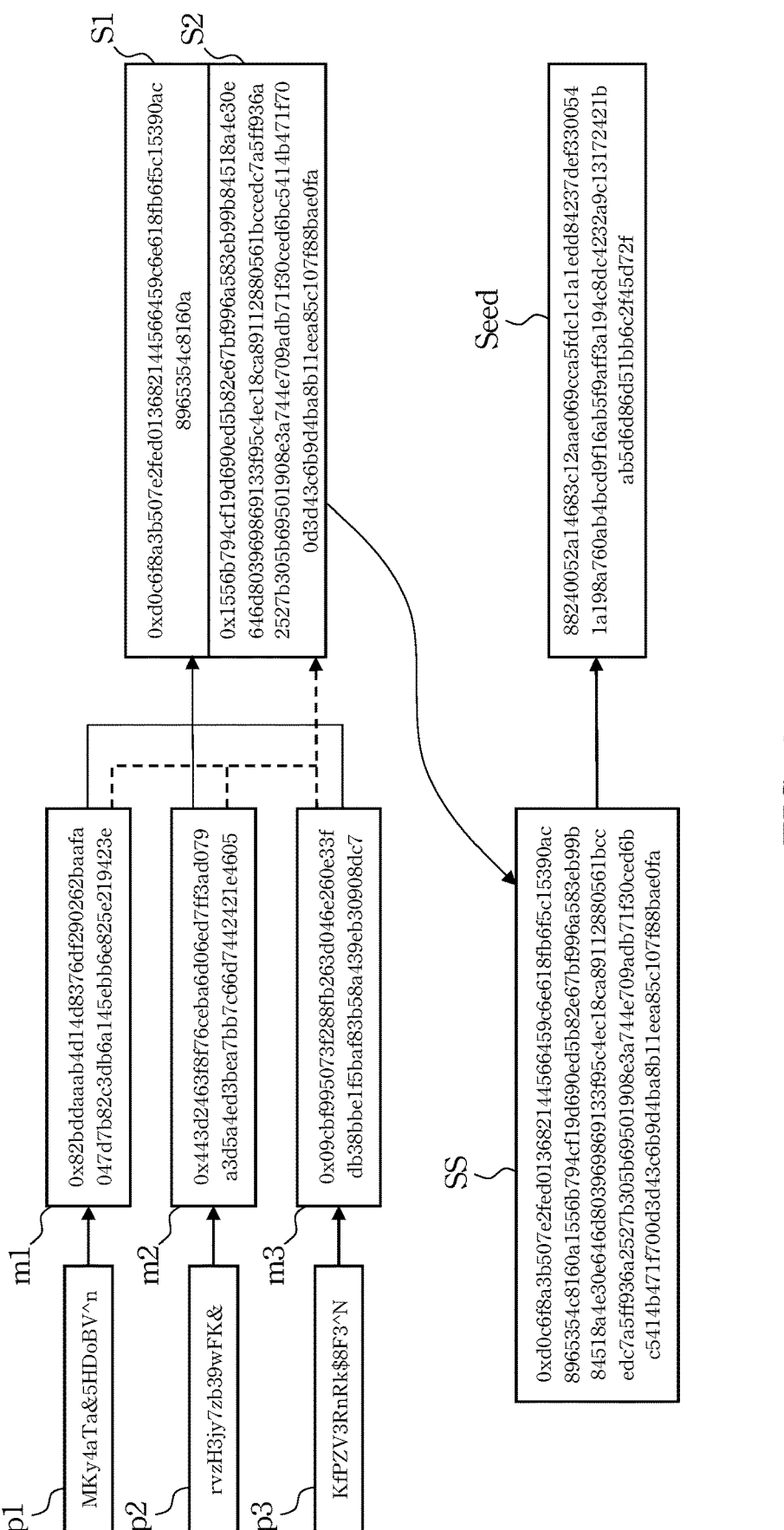
FIG. 3 is a schematic diagram of an information change process according to one embodiment of the instant disclosure.

Referring to FIG. 2 and FIG. 3. FIG. 2 is a flowchart of a key generation method according to one embodiment of the instant disclosure. FIG. 3 is a schematic diagram of an information change process according to one embodiment of the instant disclosure. Firstly, the electronic devices 2 respectively generate data fragments m1, m2 and m3 in response to a key generation instruction (step 41). The key generation instruction can be generated by a user through operating an operation interface (such as a user interface of an application program) of the electronic device 2. For example, the user interface can include an input field for the user to input information (hereinafter referred to as input information p) through an input interface such as a keyboard or voice typing. In other words, the key generation instruction can include the input information p. Herein, the input information p can be a word string with a specific meaning or without a meaning, and it can be of any length and can be composed of English capital letters, small letters, special symbols and numbers. In some embodiments, the input information p is generated according to information of other forms, for example, the operation interface of the electronic device 2 can be configured to allow the user to input a file (such as a music file, a graph file or a digital signature), and the electronic device 2 performs hash algorithm (such as SHA256) based on the file to generate the input information p after receiving the file. As shown in FIG. 3, the three electronic devices 2 respectively obtain input information p1, p2 and p3. The electronic devices 2 then respectively generate the data fragments m1, m2 and m3 according to the input information p1, p2 and p3. Specifically, the electronic devices 2 perform the hash algorithm (such as SHA256) according to the input information p1, p2 and p3 to generate the data fragments m1, m2 and m3.

In step 42, the server device 1 is configured to receive the data fragments m1, m2 and m3 of the electronic devices 2, and perform multiple times of quadrature or summation operations according to the data fragments m1, m2 and m3, so as to generate a sequence after each operation. Specifically, referring to the following Formula 1, at least one parameter in the operation formula executed each time is different, so as to generate at least two sequences S1 and S2 (taking two as examples herein).

$$S = \sum_{i=1}^{n} c \cdot m_i^{k} \text{ or } \prod_{i=1}^{n} c \cdot m_i^{k}$$

S represents the sequence; $m_i$ represents data fragment m; n represents the number of the data fragments m (3 in this case); c and k are positive integers; and the at least one different parameter is selected from at least one of an operator, c and k. For example, as shown in FIG. 3, if c and k are both 1 and a summed 'Σ' operator is adopted, the sequence S1 is calculated by m1+m2+m3; and if c and k are both 1 and a quadrature 'Π' operator is adopted, the sequence S2 is calculated by m1×m2×m3. In this way, different sequences S1 and S2 can be obtained. Compared with the calculation of only a single sequence, the probability of generating a same algorithm result can be reduced, and collision can be avoided. For example, the sequence S1 is calculated by m1+m2+m3, the sequence S2 is calculated by $m1^2+m2^2+m3^2$, and at the moment, k adopted by the operation formulas of the two sequences S1 and S2 is different, so that even if the same 'Σ' operator is used, two different sequences S1 and S2 can be obtained. According to the above operation formulas, due to the fact that the operator for summation or quadrature is adopted, the coefficient c of each of the data fragments m1, m2 and m3 is the same, and the power function k of each of the data fragments m1, m2 and m3 is the same, so that the data fragments m1, m2 and m3 have no order of operation during operation, and there is no different results can be generated due to different orders of operation.

In step 43, the server device 1 is configured to cascade each of the sequences S1 and S2 to obtain a sequence SS, perform hash algorithm on the sequence SS to form a seed Seed, and then generate a key according to the seed Seed. In some embodiments, the seed Seed is directly used as the key. In other embodiments, the hash algorithm is performed on the seed Seed, and an algorithm result is used as the key. In some embodiments, the generated key is used as a private key, and a public key is calculated through an asymmetric encryption algorithm (such as an elliptic curve algorithm SECP256K1). In an application, the public key is used as an address of a digital wallet, and the private key is used for verifying an access right of the digital wallet. The generated key is not stored by any electronic device 2 or the server device 1, and the key can be re-synthesized only through step 42 and step 43 when needed, so that the security risk of key leakage can be reduced. In some embodiments, the generated key can be used as a unique key for symmetric encryption (such as AES). In some embodiments, the generated key can be used as the private key and the public key for asymmetric encryption (such as RSA).

In some embodiments, after the data fragments m are generated through step 41, the electronic devices 2 will store the data fragments m generated respectively, and the data fragments m are sent to the server device 1 when a key needs to be synthesized again subsequently.

In some embodiments, the electronic devices 2 do not store the data fragments m; and when a key needs to be synthesized, the electronic devices 2 will generate the data fragments m again through step 41.

Although the electronic devices 2 perform hash algorithm on the input information p1, p2 and p3 in step 41, the server device 1 can perform hash algorithm on the input information p1, p2 and p3 in some embodiments. In other words, the data fragments m sent by the electronic devices 2 can be the input information p which has not been subjected to hash algorithm.

In some embodiments, before hash algorithm is performed on the cascaded sequence SS, a salt can be added to the cascaded sequence SS, and then hash algorithm is performed on the cascaded sequence SS after the salt is added. Therefore, the security can be further improved.

In some embodiments, before hash algorithm is performed on the seed Seed, a salt can be added to the seed Seed, and then hash algorithm is performed on the seed Seed after the salt is added. Therefore, the security can be further improved.

In some embodiments, before hash algorithm is performed on the input information p1, p2 and p3, salts can be added to the input information p1, p2 and p3 respectively, and then hash algorithm is performed on the input information p1, p2 and p3 after the salts are added. Therefore, the security can be further improved. In order to avoid affecting the sequence, the salts added to the input information p1, p2 and p3 are the same.

In some embodiments, the added salt can be preset or can be a password input by the user through the user interface.

In some embodiments, the salt is generated jointly according to the passwords input by the electronic devices 2. For example, after the password of each electronic device 2 is subjected to hash algorithm, a result of the hash algorithm of each password is taken as the data fragment m, and a finally formed key is taken as the salt through step 42 and step 43.

In some embodiments, one of the passwords input by the electronic devices 2 can be selected as the salt. For example, the password sent by the electronic device 2 requesting to synthesize the key is taken as the salt.

In some embodiments, in addition to generating the data fragments m according to the input information p, the data fragment m can also be generated by combining the input information p with other information, such as a time stamp. For example, each electronic device 2 obtains a time stamp in response to a key generation instruction, and generates the data fragment m according to the input information p and the time stamp (for example, hash algorithm is performed after the input information p and the time stamp are cascaded to form a new word string). Randomness can be added through the time stamp, thereby avoiding collision (namely, synthesis of a key the same as that of other groups is avoided).

In some embodiments, the data fragment m can also be generated only according to the time stamp without using the input information p. The embodiment of the instant disclosure does not limit the sources of the data fragment m.

In some embodiments, after the user operates the first electronic device 2 to connect with the server device 1, the server device 1 provides a web link (for example, in a two-dimensional barcode form or a website link form) for the first electronic device 2, and other electronic devices 2 communicate with the server device 1 through the web link obtained by the first electronic device 2, so that the server device 1 can recognize that the electronic devices are associated with the first electronic device 2. The associated electronic devices 2 can respectively provide a data fragment m.

In some embodiments, the associated electronic devices 2 can also transmit an identification code (such as an International Mobile Equipment Identity (IMEI), a Media Access Control (MAC) address or an identification code of other internal hardware elements) associated with the electronic devices to the server device 1, so that the server device 1 records the identification codes in a group list. When the server device 1 receives a key synthesis request transmitted by one electronic device 2 in the group list, the server device 1 requests the corresponding data fragments m from other electronic devices 2 based on the identification code in the group list. Herein, the electronic device 2 transmitting the key synthesis request also transmits the corresponding data fragment m while transmitting the key synthesis request. On the other hand, the electronic device 2 provides the identification code for the server device 1, and the identification code can be used for security verification to confirm that the electronic device 2 providing the data fragment m is a legal device.

In some embodiments, different group lists use different operation formula parameter configurations. For example, one group list uses operation formulas of m1+m2+m3 and m1×m2×m3, and another group list uses operation formulas of m1+m2+m3 and 7m1+7m2+7m3. The server device 1 will record the operation formula parameter configuration used by each group list, so that the operation formula parameter configuration can be used in a process of synthesizing the data fragments m into the key.

In some embodiments, communication content between the server device 1 and the electronic devices 2 is encrypted. The encryption can be a symmetric encryption technology or an asymmetric encryption technology.

According to the distributed key generation system and the key generation method provided by the embodiments of the instant disclosure, the key is not generated in advance and then segmented; the plurality of electronic devices 2 respectively provide the data fragments m, and the key is synthesized in real time according to the data fragments m. Therefore, the risk of key leakage when the key is generated in advance can be avoided. In addition, the data fragments m are dispersedly stored by the plurality of electronic devices 2, so that the security can be enhanced.

What is claimed is:

1. A distributed key generation system, comprising:
   a plurality of electronic devices, each electronic device sending a data fragment; and
   a server device, configured to, rather than generating a key in advance, synthesize the key after receiving the data fragments sent by the electronic devices according to the data fragments;
   wherein synthesizing the key comprises:
   performing multiple times of quadrature or summation operations according to the data fragments so as to generate a sequence after each operation;
   cascading each sequence and perform hash algorithm to form a seed; and
   generating the key according to the seed.

2. The distributed key generation system according to claim 1, wherein an operation formula of the operation executed by the server device is $S=\Sigma_{i=1}^{n}c\cdot m_i^{k}$ or $\Pi_{i=1}^{n}c\cdot m_i^{k}$;
   wherein S represents the sequence; $m_i$ represents the data fragment; n represents the number of the data fragments; c and k are positive integers; at least one parameter in the operation formula executed each time is different, and the at least one different parameter is selected from at least one of an operator, c and k.

3. The distributed key generation system according to claim 1, wherein each electronic device obtains a time stamp in response to a key generation instruction, and generates the data fragment according to the time stamp.

4. The distributed key generation system according to claim 3, wherein the key generation instruction comprises input information, and each data fragment is generated according to the input information.

5. The distributed key generation system according to claim 3, wherein the key generation instruction comprises input information, and each data fragment is generated according to the input information and the time stamp.

6. The distributed key generation system according to claim 3, wherein each electronic device stores the data fragment generated respectively and sends the data fragment to the server device.

7. The distributed key generation system according to claim 3, wherein before the server device performs hash algorithm on the cascaded sequences, a salt is added to the cascaded sequences.

8. The distributed key generation system according to claim 7, wherein the salt is a password sent by the electronic device requesting to synthesize the key.

9. The distributed key generation system according to claim 7, wherein the salt is generated according to a password input by each electronic device.

10. The distributed key generation system according to claim 3, wherein one of the electronic devices sends a key synthesis request to the server device, and the server device requests the corresponding data fragments from other electronic devices in response to the key synthesis request.

11. A distributed key generation method, being executed by a processor, wherein the key generation method comprises the following steps:
   rather than generating a key in advance, synthesizing the key after acquiring a plurality of data fragments, wherein synthesizing the key comprises:
   performing multiple times of quadrature or summation operations according to the data fragments to generate a sequence after each operation;
   cascading each sequence, and performing hash algorithm on the cascaded sequences to form a seed; and
   generating the key according to the seed.

12. The distributed key generation method according to claim 11, wherein an operation formula of the executed operation is $S=\Sigma_{i=1}^{n}c\cdot m_i^{k}$ or $\Pi_{i=1}^{n}c\cdot m_i^{k}$;
   wherein S represents the sequence; mi represents the data fragment; n represents the number of the data fragments; c and k are positive integers; at least one parameter in the operation formula executed each time is different, and the at least one different parameter is selected from at least one of an operator, c and k.

13. The distributed key generation method according to claim 11, wherein each data fragment is generated by information input through an input interface and a time stamp.

14. The distributed key generation method according to claim 11, further comprising:
   adding a same salt to the data fragments.

15. The distributed key generation method according to claim 11, wherein before performing hash algorithm on the cascaded sequences, the method further comprises: adding a salt into the cascaded sequences.

* * * * *